(12) United States Patent
Selci

(10) Patent No.: US 6,354,776 B1
(45) Date of Patent: Mar. 12, 2002

(54) ELECTRIC DRIVE SPINDLE

(75) Inventor: Giancarlo Selci, Pesaro (IT)

(73) Assignee: H.S.D. S.r.l. (IT)

( * ) Notice: Subject to any disclaimer, the term of this patent is extended or adjusted under 35 U.S.C. 154(b) by 0 days.

(21) Appl. No.: 09/606,805

(22) Filed: Jun. 29, 2000

(30) Foreign Application Priority Data

Jun. 30, 1999 (IT) .......................................... B099A0358

(51) Int. Cl.⁷ .......................... B23Q 17/00; B23B 31/26; B23C 1/00
(52) U.S. Cl. ........................... 409/233; 409/231; 483/34
(58) Field of Search ................................ 409/233, 231, 409/220; 483/10, 35, 30, 34

(56) References Cited

U.S. PATENT DOCUMENTS

| 3,520,228 A | 7/1970 | Wohlfeil | 90/11 |
| 4,075,927 A | 2/1978 | Frazier | 90/11 |
| 4,583,894 A | 4/1986 | Mitchell | 409/233 |

FOREIGN PATENT DOCUMENTS

| DE | 42010133 A | 7/1993 | B23Q/17/22 |
| DE | 19629991 A | 1/1998 | B23B/19/02 |
| JP | 01321151 A | 12/1989 | B23Q/17/24 |

*Primary Examiner*—Burton S. Mullins
(74) *Attorney, Agent, or Firm*—Mayer, Brown & Platt

(57) ABSTRACT

In a drive spindle an electric motor has an output shaft which defines a spindle able to receive an associated tool and associated with an attachment device movable between a position in which it locks the tool on the spindle and a release position; the operative conditions both of the spindle and of the attachment device being detectable by means of a single monitoring optical sensor.

15 Claims, 1 Drawing Sheet

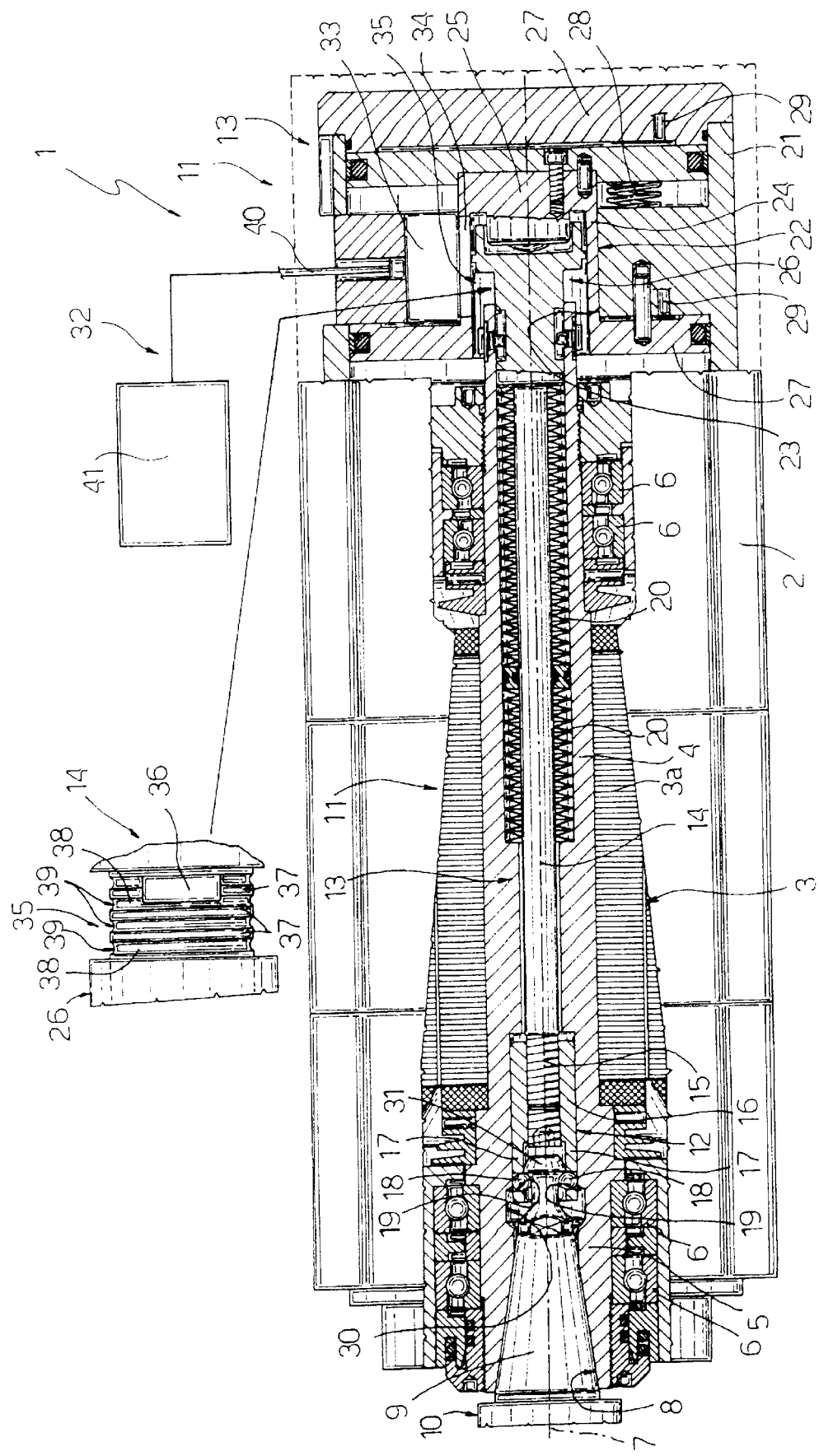

ELECTRIC DRIVE SPINDLE

The present invention relates to an electric drive spindle.

In particular, the present invention relates to an electric drive spindle of the type comprising an electric motor provided with a tubular output shaft defining a tool-carrier spindle; attachment means associated with the said spindle to fix a tool axially to the spindle itself; and a plurality of actuator means to drive the spindle to rotate about its own axis and to displace the attachment means with respect to the spindle, between a position in which it locks the tool onto the spindle and a release position.

BACKGROUND OF THE INVENTION

Generally, in use, known electrical drive spindle of the above-described type perform different operating sequences the practicability of which is tied to particular operating conditions of the tool itself. For example, the displacement of the attachment means to the release position must be prevented when the spindle is in motion. Consequently, for the purpose of guaranteeing operation in complete safety and efficiency of the electric drive spindle, operating parameters such as the different positions of the various members constituting the attachment means and the speed of rotation of the spindle must be continuously monitored.

In general, in known electric drive spindles of the above-described type, the monitoring of the above-mentioned operating parameters is effected by means of a plurality of sensors (at least four), normally of the inductive type, which are mounted on the associated electric drive spindle and the axial position of which on the axis of rotation of the spindle must be adjusted manually from the outside.

Moreover, in that the dimensions of the machines on which drive spindles are installed must be maintained within determined values, the drive spindles themselves must normally be disposed in relatively small spaces to which, however, it is necessary to be able to gain access from the outside in order to be able to perform the said adjustments on the axial position of the said sensors.

From the above explanation it results that the known drive spindles of the type described above are relatively expensive because of the high number of sensors utilised, and relatively complex in that the adjustment operations of the said inductive sensors are made particularly complicated and lengthy both because of their high number and because of the relatively narrow spaces in which the drive spindles themselves are housed.

SUMMARY OF THE INVENTION

The object of the present invention is to provide a drive spindle which will be free from the above-explained disadvantages.

According to the present invention there is provided a drive spindle comprising a tool-carrier spindle; attachment means for axially fixing a tool to the said spindle; and a plurality of actuator means to drive the said spindle to rotate about its axis and to actuate the said attachment means between a position in which the said tool is locked on the said spindle, and a release position; each said actuator means comprise at least one movable member able to vary its state (angular and/or axial position) with respect to the said axis; and monitoring means provided to monitor the said actuator means; characterised in that at least one said movable member is a reference member formed and disposed such a way as to detect the state of all the other movable members, and in that the said monitoring means comprise a single sensor, preferably an optical sensor comprising a plurality of CCD sensors disposed in a row parallel to a displacement direction of the said reference member and operable to detect the state of the said reference member.

In a preferred embodiment of the above-defined drive spindle the said attachment means comprise a grip member rotatable with the said spindle about the said axis and operable to engage a shank of the said tool, and the said actuator means comprise first actuator means for driving the said spindle to rotate about the said axis and second actuator means for displacing the said grip member between the said locking position and the said release position; the said reference member forming part of the said second actuator means.

In particular, preferably, the said first actuator means comprise an electric motor provided with a tubular output shaft which is coaxial with the said axis and defines the said spindle; the said reference member comprising a support rod connected to the said grip member and housed in the said tubular shaft for rotation therewith; the said rod being couple axially slidably to the said tubular shaft to displace the said grip member between the said locking position and the said release position.

BRIEF DESCRIPTION OF THE DRAWING

The present invention will now be described with reference to the attached drawing which illustrates in axial section a non-limitative embodiment thereof.

DETAILED DESCRIPTION OF THE INVENTION

With reference to FIG. 1, the reference numeral 1 generally indicates a drive spindle comprising a tubular outer casing 2 housing within it an electric motor 3 of known type, which comprises a rotor 3a fitted onto a tubular output shaft 4 a free end section of which defines a rotary tool-carrier spindle 5 turnable with respect to the casing 2 and, by means of the interposition of rolling element bearings 6, turnable about its own longitudinal axis 7.

The spindle 5 projects partially from the casing 2 and has a seat 8 (in the specific example a taper seat) able to receive and centre a shank 9 of an associated tool 10 of known type.

The drive spindle 1 further includes an attachment device 11 comprising, in turn, a grip member 12 able to engage the said tool shank 9, and an actuator device 13 able to displace the grip member 12 itself between a locking position (as shown in the drawing) of the tool 10 on the spindle 5 and a release position (not illustrated).

The actuator device 13 includes a substantially cylindrical rod 14 which is housed within the shaft 4 coaxial with the axis 7 and which is coupled in an angularly fixed and axially slideable manner to the shaft 4 itself. The rod 14 carries the said grip member 12 connected, at its end 15 facing the seat 8 of the spindle 5, which comprises a hub 16 coupled in such a way as to be axially and angularly fixed to the end 15 itself, and a plurality of arms 17 (only two of which are visible in the attached figure) which are uniformly spaced about the axis 7, project axially towards the seat 8 from the hub 16 and are each provided with a respective locking ball 18 housed within an associated radial seat 19 passing through a free end of the associated arm 17.

Each seat 19 is shaped in such a way as to permit the associated ball 18 to be displaced transversely of the axis 7 when the rod 14, and therefore the grip member 12, are displaced in a manner which will be described better hereinafter, in a displacement direction A parallel to the axis 7 between the said locking and release positions.

The actuator device 13 further includes a pair of springs 20 coaxial with the axis 7, which are disposed in series with one another and are interposed between the rod 14 and the shaft 4 to displace, and normally maintain, the rod 14 itself and, therefore, the grip member 12 in their locking position.

The actuator device 13 finally includes an actuator cylinder 21 which is housed within the tubular casing 2 on the side opposite the spindle 5 and in a position coaxial with the electric motor 3, which is provided with a pneumatic actuating piston 22 which is slidably mounted within a hole 23 coaxial with the axis 7 and defined within the actuator cylinder 21 itself.

The piston 22 comprises a substantially cylindrical bell 24 which is coaxial with the axis 7, closed at one end by a bottom wall 25 substantially perpendicular to the axis 7 itself, and engaged in an axially slidable manner by one end of the rod 14 opposite the end 15. The piston 22 further includes two substantially cylindrical plates 27 which are fixedly connected to the opposite ends of the bell 24 and are disposed perpendicularly of the axis 7.

When the rod 14 and the grip member 12 are disposed, under the thrust of the springs 20, in their locking positions, the piston 22 is disposed in a rest position in which, to allow the rod 14 to turn about the axis 7 without sliding on the piston 22 itself, the bottom wall 25 of the bell 24 is maintained at a given distance from the said end 26 of the rod 14 by means of at least one spring 28 which lies parallel to the axis 7 and is interposed between one of the plates 27 and the actuator cylinder 21.

The piston 22 is movable, under the thrust of a pneumatic device 29 of known type and against the thrust of the springs 20 and 28, from the said rest position to an operative position (not illustrated) in which the bottom wall 25 of the bell 24 is disposed in contact with the end 26 of the rod 14 to displace the rod 14 itself and the grip member 12 to their release positions.

In use, when there is no tool 10 in the seat 8 of the spindle 5 the rod 14 and the piston 22 of the actuator cylinder 21 are normally disposed, under the thrust of the springs 20 and 28, in their locking position and rest position respectively. In these conditions the drive spindle 1 is displaced to permit the seat 8 to be engaged by the shank 9 of a tool 10 to be gripped; simultaneously, the pneumatic device 29 is activated to cause axial displacement of the piston 22 and, therefore, the rod 14, following which the piston 22 is disposed in its operative position and the rod 14, together with the grip member 12 are disposed in the release position.

During displacement of the rod 14 from its locking position to its release position the balls 18 of the grip member 12, by becoming displaced transversely of the axis 7, engage an annular cavity 30 formed on an inner surface of the spindle 5 in such a way as to become displaced by a distance from one another which approximates, with an excess, the diameter of one end 31 of the tail 9 of the tool 10 to be gripped, and therefore permits the arms 17 of the grip member 12 to engage the end 31 itself.

At this point the pneumatic device 29 is disactivated and the piston 22 and the rod 14 are again displaced under the thrust of the springs 20 and 28 into their rest and locking positions respectively. During the displacement of the rod 14 from its release position to its locking position the balls 18 come out from the said annular cavity 30 and are disposed at a distance from one another which approximates to the diameter of the end 31 of the tail 9, and therefore allow the grip member 12 to engage the end 31 itself and to draw the tail 9 completely into the interior of the associated seat 8.

Obviously, a tool 10 mounted on the drive spindle 1 can be released by means of a sequence of operations entirely similar to those described above.

From the above description it is evident that the rod 14 is formed and disposed in such a way that it can be considered as a reference member for detecting the axial and/or angular positions with respect to the axis 7 of the movable members of the electric motor 3 and the actuator device 13, that is to say of the positions of the spindle 5 and the piston 22. In this respect the axial and angular position of the rod 14 with respect to the axis 7 is detected by means of a monitoring device 32 comprising a single optical sensor 33, in particular a sensor constituted by a linear CCD array, that is to say an optical sensor constituted by a row of CCD sensors parallel to the axis 7 itself.

The sensor 33 is housed in the actuator cylinder 21 in a position facing a slot 34 which is formed through the bell 24 of the piston 21, extends parallel to the axis 7 and in turn faces a portion 35 of the end 26 of the rod 14 extending out from the shaft 4. For the purpose of sending to the sensor 33 detector signals of the angular positions and, respectively, axial positions of the rod 14 with respect to the axis 7 the said portion 34 has two flat reflecting faces 36 disposed in diametrically opposite positions on the portion 35 itself and, respectively, two sets of annular surfaces 37 and 38, of which the surfaces 37 are reflecting surfaces defined on the outer surface of the portion 35 and the surfaces 38 are opaque surfaces alternating with the surfaces 37 and each defined by the surface of an annular groove 39 formed on the said outer surface of the portion 35 itself.

The sensor 33 is connected by means of a connection cable 40 extending through the actuator cylinder 21 and the casing 2 to a control panel 41 of known type, which is disposed outside the casing 2 itself and allows the sensor 33 to be callibrated electronically by means of the two axial limit positions of the rod 14.

The use of the optical sensor 33 in the drive spindle 1 provides, therefore, several advantages with respect to drive spindles of known type, the main one of which consists in a significant reduction in the costs of the drive spindle 1 itself due to the use of a single optical sensor 33 in place of the plurality of inductive sensors used until now. A further advantage of the drive spindle one is, moreover, represented by the fact that the adjustment and calibration of the optical sensor 33 is considerably easier in that it can be effected electronically by acting directly on the control panel 41 disposed outside the casing 2.

What is claimed is:

1. A drive spindle comprising:

a tool-carrier spindle;

an attachment means for axially locking a tool onto the spindle;

a plurality of actuator means for driving the spindle to rotate about its axis and to actuate the attachment means between a locking position for locking the tool onto the sindle and a release position, wherein each said actuator means comprises at least one movable member able to vary their axial and/or angular position with respect to the axis, and further wherein one said movable member functions as a reference for the axial and/or angular position of the other of the plurality of movable members;

a control means for controlling the actuator means; and a monitoring means for detecting the axial and/or angular position of the reference movable member.

2. A drive spindle according to claim 1, in which the reference movable member is capable of performing first displacements in a displacement direction parallel to the axis and second displacements comprising rotation with the spindle about the axis; and wherein the monitoring means is operable to detect the first and second displacements and a position assumed by the reference movable member along the axis.

3. A drive spindle according to claim 1, in which the monitoring means is an optical sensor comprising a plurality of CCD sensors disposed in a row parallel to the axis and facing a portion of the reference movable member.

4. A drive spindle according to claim 1, in which the attachment means comprises a grip member rotatable with the spindle about the axis and able to engage a shank of the tool; the actuator means comprise a first actuator means for driving the spindle to rotate about the axis, and a second actuator means for displacing the grip member between the locking position and the release position; and wherein the reference movable member forms part of the second actuator means.

5. A drive spindle according to claim 4, in which the first actuator means comprises an electric motor comprising a tubular output shaft coaxial with the axis and defining the spindle; and the reference movable member comprises a support rod connected to the grip member and housed in the tubular shaft for rotation therewith, wherein the support rod is coupled in an axially slidable manner to the tubular shaft to displace the grip member between the locking position and the release position.

6. A drive spindle according to claim 5, in which the second actuator means further comprises a first thrust means acting on the support rod to displace the grip member from the release position to the locking position, and a second thrust means acting on the support rod to displace the grip member from the locking position to the release position.

7. A drive spindle according to claim 6, in which the first thrust means are resilient thrust means operable to maintain the grip member normally in the locking position.

8. A drive spindle according to claim 6, in which the first thrust means comprises at least one spring coaxial with the axis and interposed between the tubular shaft and the support rod, and the second thrust means comprises an actuator cylinder in which a piston is movable parallel to the axis to cause axial displacement to the support rod.

9. A drive spindle according to claim 8, in which the piston comprises a tubular body coaxial with the axis, and wherein the support rod has an end portion extending from the spindle and within the tubular body.

10. A drive spindle according to claim 9, in which the end portion has a substantially cylindrical shape and includes first reflector means defined by a series of annular reflecting surfaces and a series of annular opaque surfaces alternating with the annular reflecting surfaces; and wherein the monitoring means faces the end portion of the support rod.

11. A drive spindle according to claim 10, in which the end portion includes second reflector means defined by two flat faces disposed in diametrically opposite positions on the end portion of the support rod.

12. A drive spindle according to claim 11, in which a slot is formed axially through the piston at the end portion of the support rod to render the first and second reflector means visible from the monitoring means.

13. A drive spindle according to claim 1, in which the reference movable member has two axial limit positions; and wherein the drive spindle further comprises a tubular outer casing and regulator means for calibrating the monitoring means by means of the two axial limit positions.

14. A drive spindle according to claim 13, wherein the regulator means comprises electronic regulator means disposed outside the tubular casing.

15. A drive spindle according to claim 1, wherein the monitoring means comprises a single sensor.

* * * * *